June 4, 1940. K. VAN BRIESSEN ET AL 2,203,036
APPARATUS FOR MEASURING THE COLOR OF LIGHT
Filed Dec. 3, 1938 2 Sheets-Sheet 1
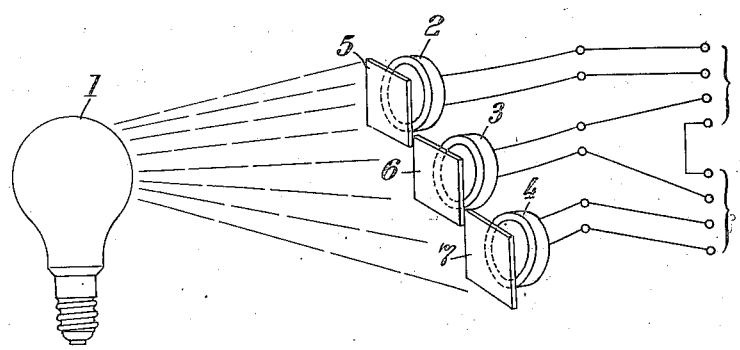
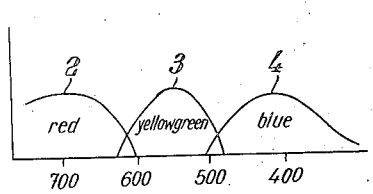
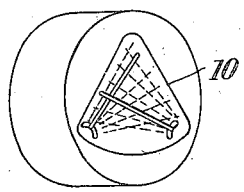
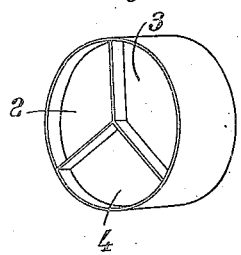
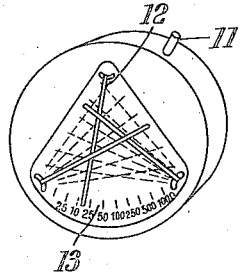
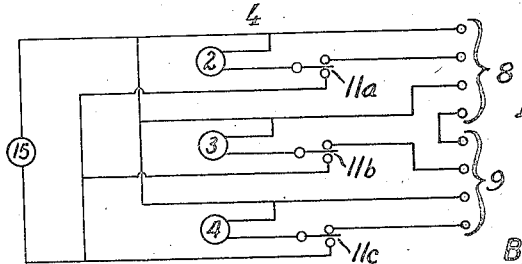
Inventors
Karl van Briessen
John Eggert
By Their Attorneys

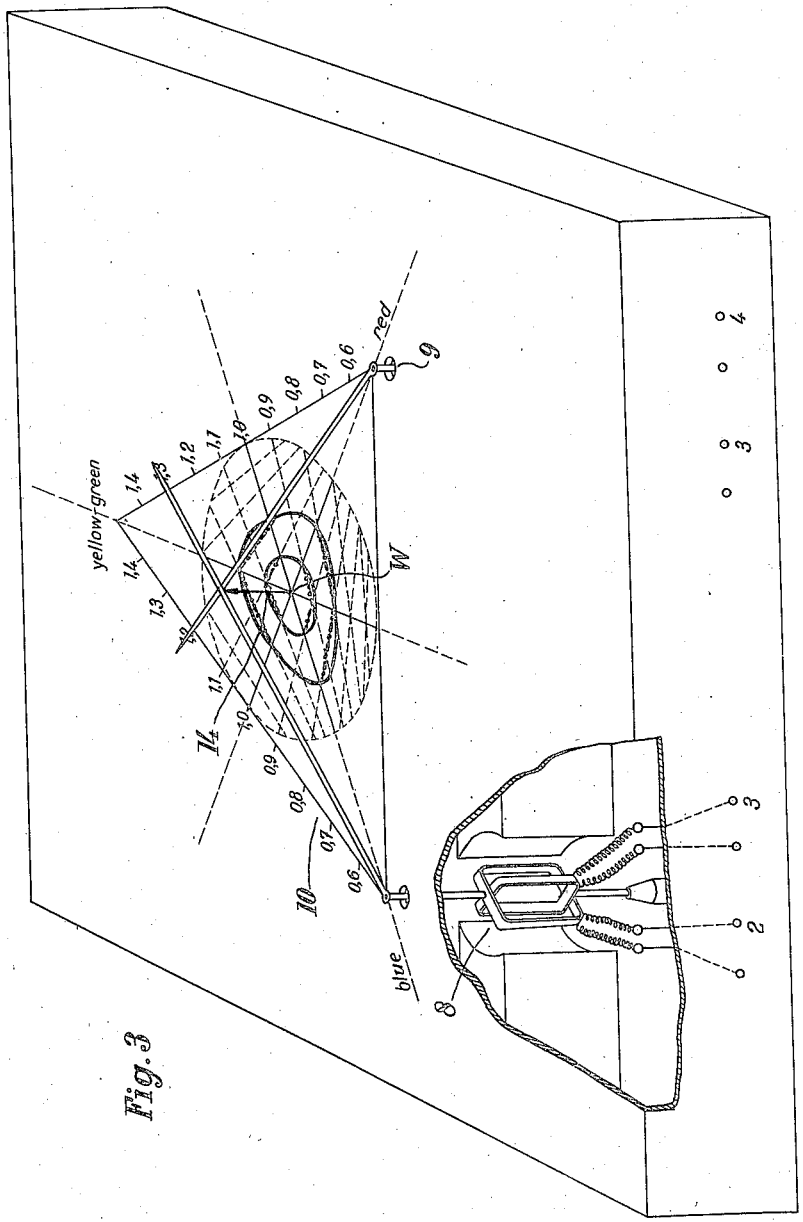

Patented June 4, 1940

2,203,036

UNITED STATES PATENT OFFICE 2,203,036

APPARATUS FOR MEASURING THE COLOR OF LIGHT

Karl van Briessen and John Eggert, Leipzig, Germany, assignors, by mesne assignments, to General Aniline & Film Corporation, New York, N. Y., a corporation of Delaware Application December 3, 1938, Serial No. 243,885
In Germany December 4, 1937

7 Claims. (Cl. 88—23)

Our present invention relates to an apparatus for measuring the color of light.

It is often desired for various purposes, especially in photography, to know the color of an illumination, in particular the ratio to one another of the intensities of the spectral components thereof.

One object of our invention is to provide an apparatus for measuring the ratio to one another of the intensities of two spectral regions by two photocells connected with an instrument adapted to measure the quotient of two electric currents, which photocells are sensitive, or are made sensitive by the interposition of filters, to the two spectral regions respectively.

Further objects of the invention will be apparent from the following disclosure.

Reference is made to the accompanying drawings in which:

Figure 1 shows a device according to our invention and provided with three rectifier photocells.

Figure 2 shows curves of sensitivity of the photocells in accordance with the invention.

Figure 3 shows a preferred arrangement of the quotient meters.

Figures 4 and 5 are views which show the apparatus constructed in a single casing.

Figure 6 shows the apparatus connected with a switch.

Figure 7 is a circuit diagram of the device of Figure 6.

If the intensities of only two spectral regions, for example two complementary colors, are to be measured, it suffices if only two photocells, one sensitive to one color and the other sensitive to the other color, are connected with the quotient meter. The pointer of the meter may then indicate the ratio of the intensities of the colors on a scale.

If the intensities of three spectral regions, for example the three primary colors red, yellowish-green and blue, are to be measured, two quotient meters are necessary; the axes of the meters are preferably arranged at two corners of an equilateral triangular scale ("color triangle"). The three photocells, of which each is sensitive to one of the spectral regions, are connected with the two quotient meters in such a manner that two of the photocells are each connected with only one of the quotient meters, while the third is connected with both quotient meters. Instead of the latter cell two photocells may be used each of which is connected with one of the quotient meters, so that the two measuring systems act completely independent of one another.

To enable the photocells to measure the total intensity of the light, a device may be provided which disconnects the photocells from the quotient meter and connects them in parallel with one another and in series with a simple current measuring instrument, for example a milliammeter. There can then be measured by means of the apparatus both the color and the total intensity of the light. The system of photocells and measuring instruments may advantageously be combined in a single apparatus which is preferably as small as possible so that it can be comfortably carried in the pocket like the usual exposure meters. In certain circumstances it can, however, be constructed in a photographic camera or a cinematograph camera.

In Figure 1, there are provided three rectifier photocells 2, 3 and 4 for measuring the color of the light from a lamp 1. These cells are caused by their natural sensitivity in combination with filters 5 (red), 6 (yellowish-green) and 7 (blue) to respond respectively to the red, green and blue spectral regions so that they each give the same current intensity with a standard white light (for example a Gibson light) and have sensitivity curves somewhat as shown in Figure 2. If now the three spectral components of the source of light to be tested have the same intensity, the intensity of the currents yielded by the three photocells is the same. The currents from the photocells are fed to quotient meters 8 and 9, that of the photocell 2 to the meter 8 and that of the photocell 4 to the meter 9, while the photocell 3 is connected with both meters 8 and 9. The quotient meters are mounted, as shown in Figure 3, with the axes of their turning systems at the corners of an equilateral triangle 10. If the intensity of all the colors is the same, that is the source of light 1 emits pure white light, the ratio of the quotients of the two instruments is 1, and their pointers intersect at the center of gravity of the triangle, the "white point." If, on the other hand, there is a preponderance of one color, the pointer of the appropriate quotient meter is deflected to the corresponding side. The two pointers then cross each other at a different point, and thus indicate the color of the light. Numbers are written at the sides of the triangle which indicate the ratio of the intensities of the two colors marked at the corners joined by the side in question. The arrow 14—the "color vector"—indicates the direction and magnitude of the deviation of the point of intersection of the pointers from the "white point." The dotted-dashed lines are lines of equal color saturation; the dashed lines are lines of equal ratio of two color components. By suitable choice of the range of measurement of the instruments, it is possible to select small regions of the color triangle and thereby increase the accuracy of measurement in the region selected. The technical color triangle in the form described above is not directly comparable with the physical color triangle. By appropriate variation of the sensitivity of the quotient meter, and of the distribution of the spectrum by color filters, a close approximation can, however, be obtained. For the practical comparison of the colors of sources of illumination this technical color triangle is sufficient in by far the greater number of cases.

The whole apparatus can, as shown in Figures 4 and 5, be constructed in a single housing on one side of which, shown in Figure 5, are the photocells 2, 3 and 4 and on the other side of which, shown in Figure 4 is the color triangle 10.

To enable the instrument to measure the total intensity of the light, a switch 11 can be provided, as shown in Figure 6, on the housing of the apparatus. Switch 11 may be of the three-pole, double-throw, push-button type, of which the individual switch members 11a, 11b and 11c (Figure 7) normally connect the photocells 2, 3 and 4 with the quotient meters 8 and 9, but may be actuated as a unit to break the quotient meter circuits and connect said photocells, in parallel, with milliammeter 15. The milliammeter 15 has a pointer 12 (Figure 6) which moves over a scale 13 indicating the total intensity of the light.

We claim:

1. An apparatus for measuring the color of light of a source of light which comprises a member having a color triangle described thereon, two pointer meters each adapted to measure the quotient of the intensities of two electric currents, the axes of the turning systems of said quotient meters being at corners of said color triangle, the pointers of said quotient meters intersecting at the center of gravity of said triangle if the quotient of the intensities of the two electric currents is 1 in the case of each meter and at least three photocells sensitive to three different ranges of the spectrum respectively and receiving light from said source of light, each of said quotient meters being connected with two of said photocells, one of said quotient meters being affected by two of said spectral components and the other quotient meter by one of said two components and the third component.

2. An apparatus for measuring the color of light of a source of light which comprises a member having a color triangle described thereon, two pointer meters each adapted to measure the quotient of the intensities of two electric currents, the axes of the turning systems of said quotient meters being at corners of said color triangle, the pointers of said quotient meters intersecting at the center of gravity of said triangle if the quotient of the intensities of the two electric currents is 1 in the case of each meter and three photocells sensitive to three different ranges of the spectrum respectively and receiving light from said source of light, two of said photocells being each connected with only one of said quotient meters and the third photocell with both quotient meters.

3. An apparatus for measuring the color of light of a source of light which comprises a member having a color triangle described thereon, two pointer meters each adapted to measure the quotient of the intensities of two electric currents, the axes of the turning systems of said quotient meters being at corners of said color triangle, the pointers of said quotient meters intersecting at the center of gravity of said triangle if the quotient of the intensities of the two electric currents is 1 in the case of each meter and four photocells sensitive to three different ranges of the spectrum respectively and receiving light from said source of light, two of said photocells of different spectral sensitivity being connected with each of said quotient meters respectively.

4. An apparatus for measuring the color of light of a source of light which comprises a member having a color triangle described thereon, two pointer meters each adapted to measure the quotient of the intensities of two electric currents, the axes of the turning systems of said quotient meters being at corners of said color triangle, the pointers of said quotient meters intersecting at the center of gravity of said triangle if the quotient of the intensities of the two electric currents is 1 in the case of each meter and at least three photocells made sensitive to three different ranges of the spectrum respectively by color filters and receiving light from said source of light, each of said quotient meters being connected with two of said photocells, one of said quotient meters being affected by two of said spectral components and the other quotient meter by one of said two components and the third component.

5. An apparatus for measuring the color of light of a source of light which comprises a member having a color triangle described thereon, two pointer meters each adapted to measure the quotient of the intensities of two electric currents, the axes of the turning systems of said quotient meters being at corners of said color triangle, the pointers of said quotient meters intersecting at the center of gravity of said triangle if the quotient of the intensities of the two electric currents is 1 in the case of each meter and three photocells, one photocell being sensitive to red, another to yellowish-green, and the third to blue, said photocells receiving light from said source of light, two of said photocells being each connected with only one of said quotient meters and the third photocell with both quotient meters.

6. An apparatus for measuring the color of light of a source of light which comprises a member having a color triangle described thereon, two pointer meters each adapted to measure the quotient of the intensities of two electric currents, the axes of the turning systems of said quotient meters being at corners of said color triangle, the pointers of said quotient meters intersecting at the center of gravity of said triangle if the quotient of the intensities of the two electric currents is 1 in the case of each meter, at least three photocells sensitive to three different ranges of the spectrum respectively and receiving light from said source of light, each of said quotient meters being connected with two of said photocells, one of said quotient meters being affected by two of said spectral components and the other quotient meter by one of said two components and the third component, a current measuring instrument, and a switching device adapted to disconnect said photocells from said quotient meters and to connect said photocells in parallel with one another and in series with said current measuring instrument.

7. An apparatus for measuring the color of light of a source of light which comprises a member having a color triangle described thereon, two pointer meters each adapted to measure the quotient of the intensities of two electric currents, the axes of the turning systems of said quotient meters being at corners of said color triangle, the pointers of said quotient meters intersecting at the center of gravity of said triangle if the quotient of the intensities of the two electric currents is 1 in the case of each meter, at least three photocells sensitive to three different ranges of the spectrum respectively and receiving light from said source of light, each of said quotient meters being connected with two of said photocells, one of said quotient meters being affected by two of said spectral components and the other quotient meter by one of said two components and the third component, a current measuring instrument, and a switching device adapted to disconnect said photocells from said quotient meters and to connect said photocells in parallel with one another and in series with said current measuring instrument, said photocells, said quotient meters, and said current measuring instrument being constructed in one housing.

KARL VAN BRIESSEN.
JOHN EGGERT.